United States Patent [19]
Fukuyasu et al.

[11] Patent Number: 4,999,203
[45] Date of Patent: Mar. 12, 1991

[54] METHOD FOR PRODUCING MISO

[75] Inventors: Shigeki Fukuyasu; Makoto Nakamura, both of Toyokawa; Kyozo Kawachi, Tokyo; Seiji Yamaguchi, Sagamihara; Sakan Kinoshita, Yokohama; Tadashi Numata, Kamakura, all of Japan

[73] Assignees: Ichibiki Co., Ltd., Nagoya; Kabushiki Kaisha Toshiba, Kawasaki; Shibaura Engineering Works Co., Ltd., Tokyo, all of Japan

[21] Appl. No.: 341,545

[22] Filed: Apr. 21, 1989

Related U.S. Application Data

[62] Division of Ser. No. 102,858, Sep. 30, 1987, Pat. No. 4,870,022.

[30] Foreign Application Priority Data

Oct. 2, 1986 [JP] Japan .................................. 61-233348

[51] Int. Cl.⁵ .............................................. A23L 1/20
[52] U.S. Cl. .................................. 426/46; 426/634
[58] Field of Search .................................. 426/46, 634

[56] References Cited

U.S. PATENT DOCUMENTS

| Re. 31,513 | 1/1984 | Glen | 426/521 |
|---|---|---|---|
| 3,060,039 | 10/1962 | Froscher et al. | 426/521 |
| 4,028,470 | 6/1977 | Hayashi et al. | 426/46 |
| 4,308,284 | 12/1981 | Noda et al. | 426/46 |
| 4,369,195 | 1/1983 | Nelson et al. | 426/634 |
| 4,476,144 | 10/1984 | Kitahara et al. | 426/46 |
| 4,816,267 | 3/1989 | Oka | 426/46 |

OTHER PUBLICATIONS

Shurtleff, W., The Book of Miso, Autumn Press, pp. 29-44.

Primary Examiner—Donald E. Czaja
Assistant Examiner—Helen Pratt
Attorney, Agent, or Firm—Oblon, Spivak, McClelland, Maier & Neustadt

[57] ABSTRACT

A method of producing miso according to this invention comprises the steps of preparing a raw solution as a flavor raw material of the miso, converting the raw solution into a flavor solution by means of a predetermined fermentation treatment, preparing a digested material as a major raw material of the miso, and mixing the flavor solution with the digested material, to thereby produce the miso.

28 Claims, 3 Drawing Sheets

METHOD FOR PRODUCING MISO

This is a division, of application Ser. No. 07/102,858, filed on Sept. 30, 1987.

BACKGROUND OF THE INVENTION

The present invention relates to an apparatus and method for producing miso.

Conventionally, miso is produced as follows:

A mixture of steamed-boiled soybeans, koji of rice, salt, and yeast is placed in a stainless tank and is kept at a temperature of 28° C. to 32° C. for one to three months, for fermentation and ripening to take place, whereby miso is produced.

The disadvantage inherent in the conventional method, as described above, in that the fermentation and ripening process takes a considerable length of time. Consequently, the conventional method of producing miso requires the use of a large number of fermentation tanks, as well as the availability of a large amount of storage space for storing the end-product. In addition, since it is not possible, when using the conventional method, to precisely control fermentation and ripeness, it is therefore difficult to obtain miso of a consistent, uniform quality, e.g., uniform salt content, alcohol content, amino acid content, lactic content, and so forth.

SUMMARY OF THE INVENTION

It is a first object of the present invention to provide an apparatus and method for producing a fast-brewing miso, whereby miso of a consistent, uniform quality can be produced within a short period of time.

It is a second object of the present invention to provide an apparatus and method for producing a low-salt fast-brewing miso having a uniform quality.

In order to achieve the first object, according to the present invention, a raw solution (A) of miso is supplied to a fermentation mechanism (13), and a flow-out solution (B) from the fermentation mechanism and a digested material (C) are supplied to a mixing tank (27), so that the flow-out solution (B) and the digested material (C) are mixed in the mixing tank, to brew miso (D) quickly. (Note that a product obtained by digesting at about 55° C. a mixture chiefly consisting of the steamed-boiled soybeans, koji of rice, and salt is called a digested material. Also the flow-out solution (B) is called a flavor solution).

In order to achieve the second object, according to the present invention, a solution flowed from the fermentation mechanism is subjected to sterilization (73, 74) such as by heating, thereby resulting in decrease in a salt concentration of the miso.

DETAILED DESCRIPTION OF THE PREFERRED EMBODIMENTS

Figure 1:
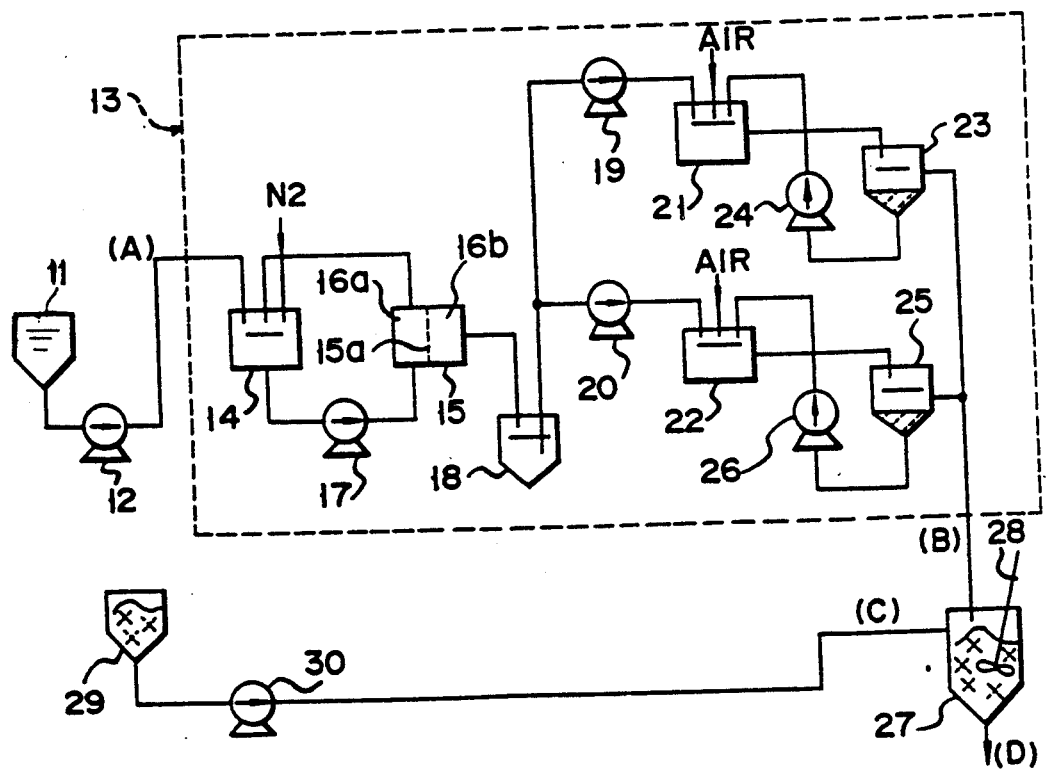
FIG. 1 is a diagram schematically showing an arrangement of a miso producing apparatus according to an embodiment of the present invention.

An embodiment of the present invention will now be described with reference to the accompanying drawings. Note that the same reference numerals in the drawings indicate components having the same functions.

The present invention was made based on the following four findings.

(1) Fermentation and ripening are based on three microbial reaction steps, that is, lactic fermentation using Pediococcus halophilus (lactic acid bacteria) as a dominant strain, main fermentation using Zygosaccharomyces rouxii (main fermentation yeast) as a dominant strain, and afterripening fermentation using Candida versatilis (afterripening fermentation yeast) as a dominant strain. (Note that as lactic acid bacteria used in the lactic fermentation, Pediococcus sojae, Pediococcus acidilactici, Pediococcus pentosaceus, Streptococcus faecalis, or Streptococcus faecium may be employed. As the afterripening fermentation yeast, Candida etchellsii may be employed.)

(2) Only soluble components (monosaccharides, amino acids, organic acids, vitamins, peptides, and the like) of a digested material contribute to the microbial reaction for fermentation and ripening. The digested material contains about 30 to 50% of the soluble components, and the residual components are left unreacted.

(3) The microbial reaction rate described in item (1) depends on a salt concentration of a solution in which the reaction progresses. For example, when the salt concentration is decreased from a conventional high salt concentration (15 to 18%) to half, i.e., to a low-salt concentration (7%), the reaction rate is increased to about 10 times at a temperature of 30° C.

(4) A raw solution (a mixture of glucose, tamarishoyu, salt, and the like) corresponding to the soluble components is fermented and ripened in a short period by the high-speed reaction of item (3). The resultant fermented, ripened solution (flavor solution) is mixed with the digested material, thereby producing miso.

The present invention was based on above findings (1) to (4). An apparatus of the present invention comprises a fermentation mechanism to which a raw solution (A) is supplied and which includes a multi-stage fermentation tank, and a mixing tank (27) for mixing a flavor solution obtained from the fermentation mechanism (13) and a digested material (C). In this apparatus, the flavor solution (B) is prepared by the fermentation mechanism (13) in a short period, and the flavor solution (B) and the digested material (C) are slowly stirred and mixed in the mixing tank (27). In this manner, miso (D) of a uniform quality can be brewed quickly.

FIG. 1 shows a schematic arrangement of a miso producing apparatus according to an embodiment of the present invention.

A raw solution containing glucose, tamari-shoyu, salt, and the like is stored in storage tank 11. The bottom portion of storage tank 11 is connected to fermentation mechanism 13 through a pipe via pump 12. Pump 12 supplies raw solution (A) to fermentation tank 14 for lactic fermentation in fermentation mechanism 13. The outlet at the bottom portion of fermentation tank 14 is connected to the inlet of condensed solution chamber 16a of ultrafiltration module 15 through a pipe via pump 17. The outlet of condensed solution chamber 16a is connected to fermentation tank 14 via a pipe. A solution in fermentation tank 14 is circulated between tank 14 and condensed solution chamber 16a.

Note that ultrafiltration module 15 can be that disclosed in, for example, U.S. Pat. No. 3,674,628 or in U.S. Pat. No. 3,423,491. The present invention incorporates all the disclosures of these U.S. Patents.

Filtered solution chamber 16b of module 15 is connected to the upper portion of storage tank 18 through a pipe. The bottom portion of storage tank 18 is connected through pipes to the upper portion of fermentation tank 21 for main fermentation via pump 19 and to the upper portion of fermentation tank 22 for afterripening fermentation via pump 20. The side portion of main fermentation tank 21 is connected through a pipe to the upper portion of precipitation tank 23. The bottom portion of tank 23 is connected through a pipe to the upper portion of fermentation tank 21. Similarly, the side portion of afterripening fermentation tank 22 is connected through a pipe to the upper portion of precipitation tank 25, and the bottom portion of tank 25 is connected through a pipe to the upper portion of fermentation tank 22 via pump 26.

In above-mentioned three fermentation tanks 14, 21, and 22, the following operations are performed.

In lactic fermentation tank 14, $10^5$/ml of latic acid bacteria (e.g., Pediococcus halophilus) is added at the initial stage upon production of miso.

Figure 2:
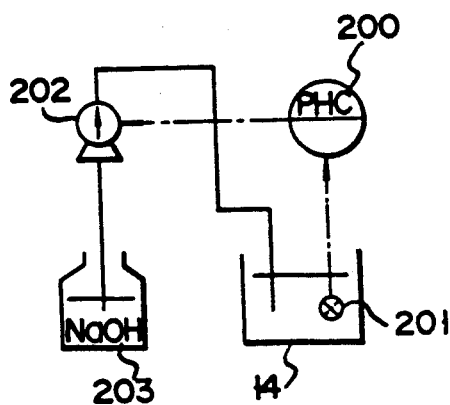
FIG. 2 is a diagram schematically showing a pH controller for controlling the pH of lactic fermentation tank 14 shown in FIG. 1 to be constant.
Figure 3:
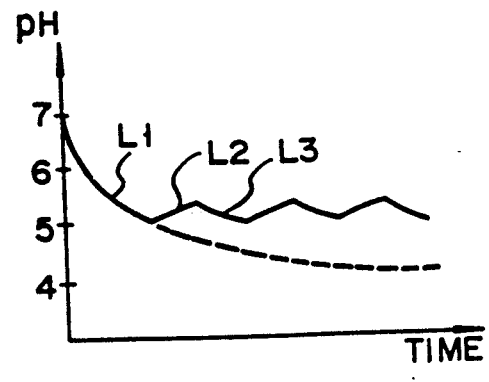
FIG. 3 is a graph for explaining the operation of the pH controller shown in FIG. 2.

Raw solution (A) with bacteria in tank 14 is subjected to automatic pH control by pH controller 200 shown in FIG. 2 to have pH = 5.0 to 5.5. FIG. 3 is a graph for explaining the operation of the pH controller shown in FIG. 2. More specifically, the pH of the solution in tank 14 is detected by pH meter 201 dipped in this solution. If the pH detection result indicates pH = 5.0 or higher, pH controller 200 performs no operation. In this case, the pH of the solution in tank 14 is gradually decreased due to the effect of lactic acid bacteria upon lapse of time, as indicated by curve L1 in FIG. 3. However, if the pH detection result indicates pH = 5.0 or lower, pH controller 200 drives pump 202 to start injection of NaOH solution 203 for adjusting the pH into tank 14. Upon injection of NaOH solution 203, the pH of the solution in tank 14 is increased as indicated by L2 in FIG. 3. When the pH of the solution has reached 5.5, pH controller 200 causes pump 202 to stop injection of NaOH solution 203 into tank 14. The pH of the solution is then decreased as indicated by L3 in FIG. 3. The pH of raw solution (A) in tank 14 can be automatically controlled to pH = 5.0 to 5.5. Note that upon pH control, if the pH must be forcibly decreased, a lactic acid can be used in place of NaOH.

The pH controlled lactic fermentation solution is allowed to reside in tank 14 at a temperature of 30° C. for 24 to 72 hours. During residence, a nitrogen gas is flowed through the solution in tank 14 at a ratio of 10V/V/hr (a ratio of a gas volume flowing through the solution per hour with respect to a volume of tank 14), and a carbon dioxide gas generated by oxygen mixed in tank 14 and metabolism is purged.

In fermentation tank 21, $10^5$/ml of main fermentation yeast (e.g., Zygosaccharomyces rouxii) is added at the initial stage. The solution with yeast cells is allowed to reside in tank 21 at a temperature of 30° C. for 24 to 72 hours. During residence, aseptic air is flowed in the solution in tank 21 at a ratio of 0.1 to 10V/V/hr to introduce oxygen necessary and sufficient for multiplication of main fermentation yeast into tank 21, and a carbon dioxide gas generated by metabolism due to a nitrogen gas in an air flow is purged.

In afterripening fermentation tank 22, $10^5$/ml of afterripening fermentation yeast (e.g., Candida versatilis) is added at the initial stage. The solution with yeast cells is allowed to reside in tank 22 at a temperature of 30° C. for 24 to 72 hours. During residence, aseptic air is flowed through the solution in tank 22 at a ratio of 0.1 to 10V/V/hr to introduce oxygen necessary and sufficient for multiplication of afterripening fermentation yeast into tank 22 in the same manner as in tank 21, and a carbon dioxide gas generated by metabolism due to a nitrogen gas in an air flow is purged.

Note that the concentration ($10^5$/ml) of cells to be added in tanks 14, 21, and 22 may be appropriately changed. However, if the concentration is too low (e.g., $10^3$/ml), a rise time of fermentation progress is delayed, while if it is too high (e.g., $10^7$/ml), the tanks are undesirably filled with low-activity cells. Thus, the concentration must be carefully set.

The arrangement of FIG. 1 will be again described. The bottom portion of storage tank 29 storing the digested material is connected through a pipe to the upper portion of mixing tank 27. The side portions of precipitation tanks 23 and 25 in fermentation mechanism 13 are also connected through pipes to the upper portion of mixing tank 27. Tank 27 is equipped with stirrer 28. Flavor solution (B) from precipitation tanks 23 and 25, and digested material (C) from storage tank 29 are slowly mixed in mixing tank 27, and miso as a product is supplied from the bottom portion of tank 27.

The fermentation and ripening operations comprising the lactic fermentation step, the main fermentation step, and afterripening fermentation step according to the miso producing apparatus shown in FIG. 1 will now be described.

(I) Lactic Fermentation Step

Raw solution (A) having a composition of 11% of glucose (=110 g/l), 10% of tamari-shoyu (=100 ml/l), and 8% of salt (=80 g/l) is stored in storage tank 11. Raw solution (A) is continuously supplied to fermentation tank 14 through pump 12.

Raw solution (A) supplied to tank 14 is circulated between tank 14 and condensed solution chamber 16a of ultrafiltration module 15 by pump 17, thereby undergoing lactic fermentation. In this case, a micro pore diameter of ultrafiltration film 15a of module 15 is preferably selected to be 1/10 an average size of lactic acid bacteria. Since the lactic acid bacteria cannot pass through film 15a, a lactic fermentation solution flowing into filtered solution chamber 16b can have no bacteria perfectly.

With the above arrangement, a lactic fermentation time can be caused to coincide with a residence time of raw solution (A) in tank 14. (The residence time is uniquely determined by the total volume of tank 14, module 15, and associated pipes, and a flow rate of the raw solution.) Therefore, when the operating speeds of pumps 12 and 17 are appropriately selected, excess fermentation of raw solution (A) can be prevented. Therefore, a lactic fermentation solution with uniform lactic concentration can be obtained from filtered solution chamber 16b of module 15.

The lactic fermentation solution with a constant lactic concentration (e.g., 3 to 4 mg/ml) is supplied to storage tank 18.

(II) Main Fermentation Step

Half the lactic fermentation solution stored in storage tank 18 is continuously supplied to fermentation tank 21 by pump 19, and main fermentation progresses in tank 21. In the main fermentation, glucose left in the lactic fermentation solution is converted to ethanol. The main fermentation solution overflows from the side portion of tank 21, and flows into precipitation tank 23. The main fermentation yeast cells are mixed in the overflow fermentation solution in precipitation tank 23. However, the main fermentation yeast cell has a size about 10 times a lactic acid bacteria cell, and has a good precipitation property. Therefore, the yeast cells can be easily separated by precipitation tank 23. The yeast precipitated in the bottom portion of tank 23 is returned to fermentation tank 21 through pump 24. The overflow solution (main fermentation solution) from the side portion of precipitation tank 23 is flowed into mixing tank 27.

By the above precipitation separation, the number of yeast cells in the main fermentation solution can be decreased to about 1/1000 of that in fermentation tank 21, thus preventing excess fermentation.

(III) Afterripening Fermentation Step

The remaining half lactic fermentation solution stored in storage tank 18 is continuously supplied to fermentation tank 22 through pump 20, and afterripening fermentation progresses in tank 22. In the afterripening fermentation, production of other flavorous components is performed. The afterripening fermentation solution prepared in fermentation tank 22 overflows from the side portion of tank 22, and is flowed into precipitation tank 25. The afterripening fermentation yeast cells are mixed in the overflow fermentation solution in precipitation tank 25, and are separated in tank 25. The yeast cells precipitated in the bottom portion of tank 25 are returned to fermentation tank 22 through pump 26. The overflow solution (afterripening fermentation solution) from the side portion of precipitation tank 25 is flowed into mixing tank 27.

Note that the afterripening fermentation solution can be prevented from being excessively fermented in the same manner as in main fermentation step (II).

The overflow solutions (main and afterripening fermentation solutions) from precipitation tanks 23 and 25 are supplied together to mixing tank 27 as flavor solution (B). Flavor solution (B) is mixed with digested material (C) in mixing tank 27 at a volume (or weight) ratio of 3:7 to 5:5, thus obtaining flavored, tasty miso (D).

In the above-mentioned three steps, organic acids, a taste component (amino acids produced by autolysis of yeast) as well as alcohols for flavor are produced at a predetermined concentration in main fermentation step (II). In afterripening fermentation step (III), organic acids, a taste component (amino acids) as well as phenols as another flavor component are produced at a predetermined concentration. Therefore, flavor solution (B) prepared by steps (II) and (III) has a stable quality.

Meanwhile, digested material (C) is prepared by a substantially stable enzyme reaction, and hence, its quality is also stable. Therefore, the quality (salt content, alcohol content, lactic acid content, sugar content, pH, flavor, and the like) of miso (D) prepared from flavor solution (B) and digested material (D) is also stable.

Note that digested material (C) is not limited to one prepared from soybeans, rice, salt, and the like as raw materials. If a material other than tamari-shoyu is used in raw solution (A), amazake (a sweet drink made from koji of rice), unrefined sake or soy, or dairy products such as yogurt with new flavor may be produced.

According to the apparatus shown in FIG. 1 using the miso producing method of the present invention, the following advantages can be expected.

(1) Since ultrafiltration module 15 is used in the lactic fermentation step (14 to 18), a change in quality of the fermentation solution upon removing lactic acid bacteria can be prevented. Since flow-out of lactic acid bacteria can be completely prevented, multiplication efficiency of lactic acid bacteria in fermentation tank 14 can be improved.

(2) Since separation by precipitation tanks 23 and 25 is performed in both main fermentation step (19, 21, 23, 24) and afterripening fermentation step (20, 22, 25, 26), the yeast cells are available to reuse so that the fermentation step can be simplified, and running cost upon production of miso can be reduced.

(3) A fermentation and ripening period requiring one to three months in the conventional method can be shortened to 3 to 12 days.

Figure 4:
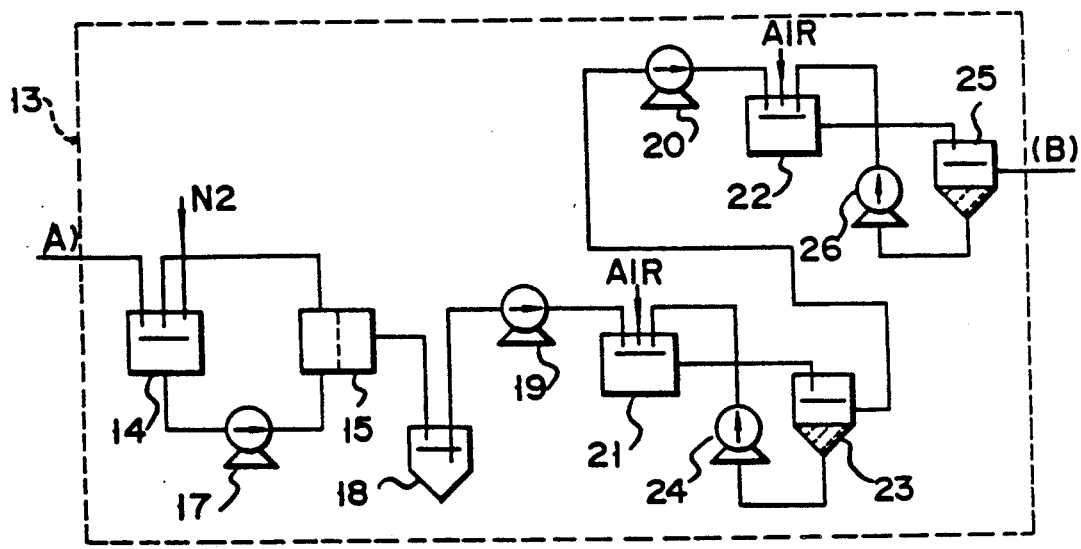
FIG. 4 is a diagram schematically showing an arrangement of a modification of fermentation mechanism 13 shown in FIG. 1.

In the embodiment shown in FIG. 1, the main fermentation step (19, 21, 23, 24) is arranged parallel to the afterripening fermentation step (20, 22, 25, 26). However, the present invention is not limited to such parallel arrangement. For example, as shown in FIG. 4, the flow-out solution from precipitation tank 23 in the main fermentation step is supplied to fermentation tank 22 of the afterripening fermentation step through pump 20, and the flow-out solution from precipitation tank 25 of the afterripening fermentation step may be supplied to mixing tank 27 as flavor solution (B).

Figure 5:
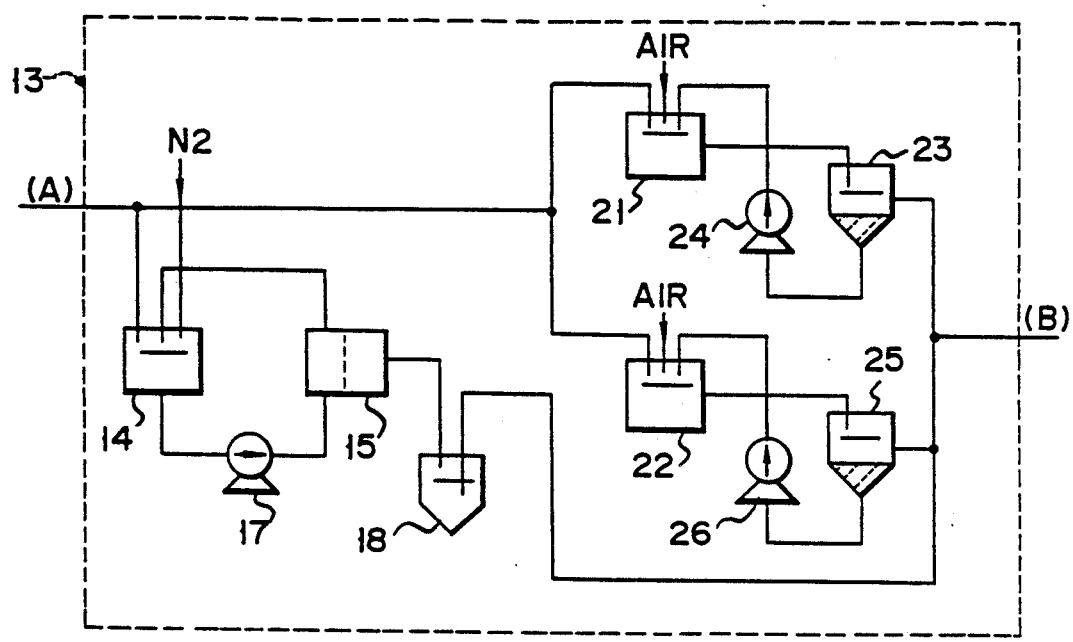
FIG. 5 is a diagram schematically showing an arrangement of another modification of fermentation mechanism 13 shown in FIG. 1.

Alternatively, as shown in FIG. 5, the main fermentation step (19, 21, 23, 24) may be arranged parallel to the lactic fermentation step (14 to 18). In this case, pump 21 can supply raw solution (A) to tanks 14, 21, and 22. Therefore, pumps 19 and 20 are omitted from FIG. 5.

Figure 6:
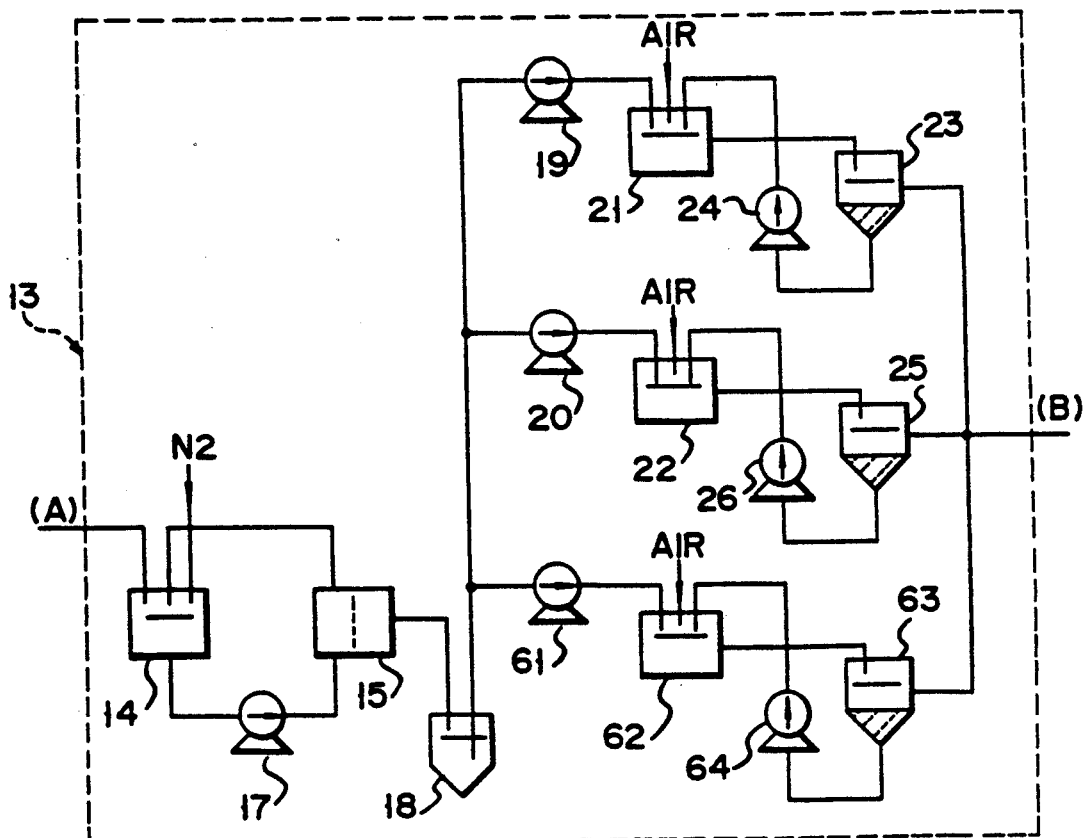
FIG. 6 is a diagram schematically showing an arrangement of still another modification of fermentation mechanism 13 shown in FIG. 1.

Furthermore, as shown in FIG. 6, a third fermentation step (61 to 64) may be arranged parallel to the main fermentation step (19, 21, 23, 24) or the afterripening fermentation step (20, 22, 25, 26). If useful strain (e.g., Saccharomyces cerevisiae), which is different from those for fermentation tanks 21 and 22, is added to fermentation tank 62 of the third fermentation step (61 to 64), a miso with a quality different from that of the apparatus shown in FIG. 1 may be obtained.

Figure 7:
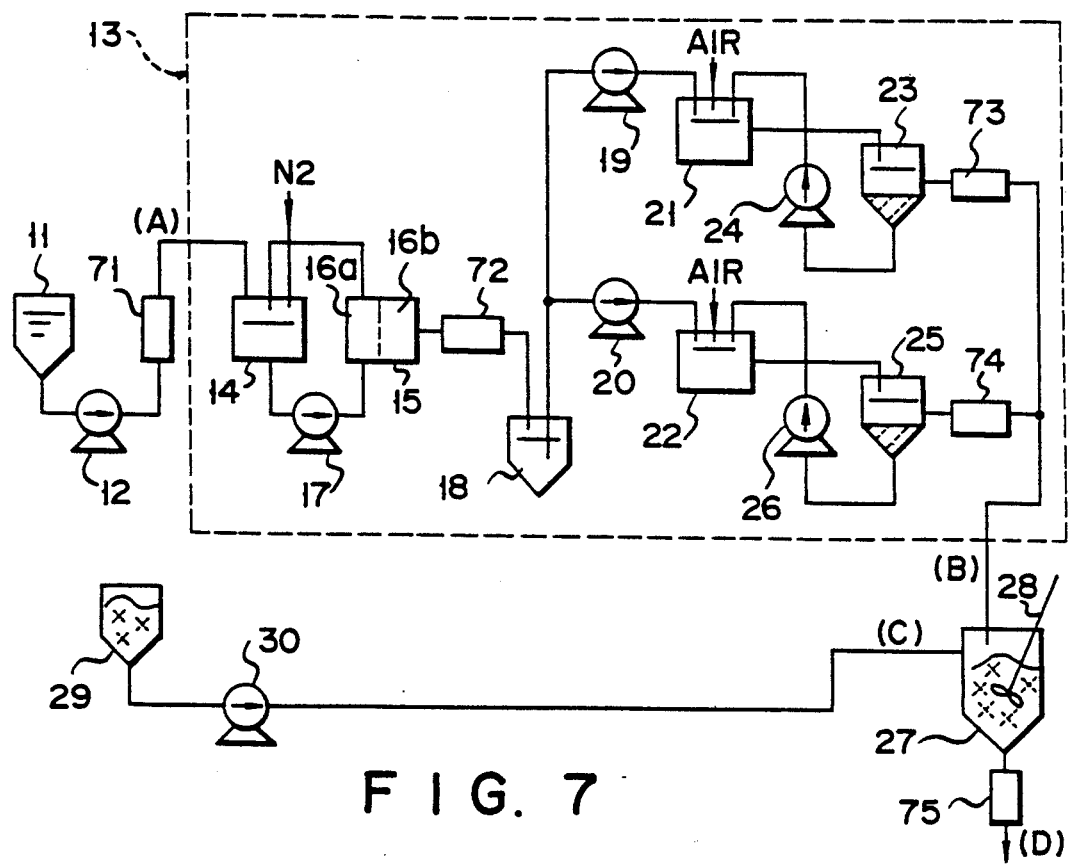
FIG. 7 is a diagram schematically showing an arrangement of an apparatus suitable for producing a low-salt miso according to another embodiment of the present invention.

In the above embodiments, a heating sterilization step can be added between two adjacent steps. Reference numerals 71 to 75 in FIG. 7 denote heaters arranged midway along pipes. These heaters 71 to 75 need not always be employed, and any of heaters 71 to 75 may be used. (For example, only heaters 73 and 74 may be used.) If sterilization is performed using these heaters, re-fermentation can be prevented so that the salt concentration of digested material (C) supplied to mixing tank 27 can be reduced, thus allowing fast brewing of a low-salt miso.

Finally, the present invention is not limited to the embodiments disclosed in the present application. Various other changes and modifications may be made within the spirit and scope of the invention.

What is claimed is:

1. A method of producing miso, comprising the steps of:
   preparing a raw solution as a flavor raw material of the miso;
   converting the raw solution into a flavor solution by means of a predetermined fermentation treatment;
   preparing a digested material which is a major raw material of the miso; and
   mixing the flavor solution with the digested material, to produce the miso.

2. The method according to claim 1, wherein the raw solution contains glucose, tamari-shoyu, and salt.

3. The method according to claim 1, wherein the digested material contains a mixture of steamed-boiled soybeans, koji of rice, and salt.

4. A method according to claim 1, wherein said predetermined fermentation treatment includes:
   the step of performing a lactic fermentation treatment for the raw solution, to prepare a lactic fermentation solution;
   the step of performing a first fermentation treatment on half of the lactic fermentation solution prepared in the first step, to prepare a main fermentation solution; and
   the step of performing a second fermentation treatment on the remaining half of the lactic fermentation solution prepared in the first step, to prepare an afterripening fermentation solution, and
   combining the main fermentation solution and the afterripening fermentation solution to form the flavor solution.

5. A method according to claim 1, wherein said predetermined fermentation treatment includes:
   the step of performing a lactic fermentation treatment for the raw solution, to prepare a lactic fermentation solution;
   the step of performing a first fermentation treatment on the lactic fermentation solution prepared in the first step, to prepare a main fermentation solution; and
   the step of performing a second fermentation treatment on the main fermentation solution prepared in the second step, to prepare an afterripening fermentation solution, and
   wherein the afterripening fermentation solution is used as the flavor solution.

6. A method according to claim 1, wherein said predetermined fermentation treatment includes:
   the step of performing a lactic fermentation treatment on a portion of the raw solution, to prepare a lactic fermentation solution;
   the step of performing a first fermentation treatment on a portion of the raw solution, to prepare a main fermentation solution;
   the step of performing a second fermentation treatment on a portion of the raw solution, to prepare an afterripening fermentation solution,
   wherein the lactic fermentation solution, the main fermentation solution, and the afterripening fermentation solution are combined as the flavor solution.

7. The method according to claim 4, which further comprises:
   during said lactic fermentation step, preparing a lactic fermentation solution by adding lactic acid bacteria to stored raw solution;
   filtering an asceptic lactic fermentation solution from which lactic acid bacteria have been removed from the lactic fermentation solution in a filtration means; and
   circulating the filtered lactic fermentation solution between the lactic fermentation section and the means for filtering said lactic fermentation solution.

8. The method according to claim 7, which further comprises controlling the pH of the lactic fermentation solution to a predetermined value.

9. The method according to claim 7, wherein nitrogen gas flows through the lactic fermentation solution in said lactic fermentation section.

10. The method according to claim 4, which further comprises:
    adding a yeast of predetermined type to stored lactic fermentation solution in the main fermentation section thereby preparing a main fermentation solution;
    separating an asceptic main fermentation solution from which the yeast of a predetermined strain is removed from the main fermentation solution in a main fermentation solution-separating means; and
    circulating the main fermentation solution between said main fermentation section and said main fermentation solution-separating means.

11. The method according to claim 10, wherein said predetermined yeast is Zygosaccharomyces rouxii.

12. The method according to claim 10, wherein asceptic air flows through the main fermentation solution in the main fermentation section.

13. The method according to claim 4, which further comprises:
    storing lactic fermentation solution in an afterripening fermentation section and adding thereto a predetermined strain of afterripening yeast which prepares an afterripening fermentation solution;
    separating an asceptic afterripening solution from which said predetermined afterripening yeast is removed, from the after ripening fermentation solution by an afterripening fermentation solution-separating means; and
    circulating the afteripening fermentation solution obtained between said afterripening fermentation section and said afterripening fermentation solution-separating means.

14. The method according to claim 13, wherein said predetermined strain of afterripening yeast is Candida versatilis.

15. The method according to claim 13, wherein said afterripening yeast is Candida etchellsii.

16. The method according to claim 13, wherein asceptic air is passed through the afterripening fermentation solution in said afterripening fermentation section.

17. The method according to claim 4, which further comprises:
    performing a third fermentation treatment on the lactic fermentation solution to prepare an additional fermentation solution; and forming the flavor solution by combining the main fermentation solution, the afterripening fermentation solution and the additional fermentation solution prepared in the step above.

18. The method according to claim 5, which further comprises:
   adding lactic acid bacteria to stored raw solution in the lactic fermentation section to prepare a lactic fermentation solution;
   filtering an asceptic lactic fermentation solution from which the lactic acid bacteria have been removed from the lactic fermentation solution in a filtering means; and
   circulating the lactic fermentation solution between said lactic fermentation section and the filter means.

19. The method according to claim 5, which further comprises:
   adding to lactic fermentation solution which is stored in the main fermentation section a predetermined strain of yeast to prepare a main fermentation solution;
   separating a sterilized main fermentation solution from which said predetermined yeast strain is removed from the main fermentation solution in a main fermentation solution-separating means; and
   circulating the main fermentation solution between said main fermentation section and said main fermentation solution-separating means.

20. The method according to claim 19, which further comprises:
   adding to said asceptic main fermentation solution a predetermined strain of afterripening yeast to prepare an afterripening fermentation solution in the afterripening fermentation section;
   separating an asceptic afterripening solution from which said predetermined strain of afterripening yeast is removed, from the afterripening fermentation solution in an afterripening fermentation solution-separation means; and
   circulating the afterripening fermentation solution between said afterripening fermentation section and said afterripening fermentation solution-separation means.

21. The method according to claim 6, which further comprises adding lactic acid bacteria to stored raw solution in a lactic fermentation section thereby preparing a lactic fermentation solution;
   filtering an asceptic lactic fermentation solution from which lactic acid bacteria have been removed from the lactic fermentation solution; and
   circulating the lactic fermentation solution between said lactic fermentation section and the means in which the lactic fermentation solution is filtered.

22. The method according to claim 21, which further comprises:
   adding a predetermined strain of yeast to a raw solution stored in the main fermentation section thereby preparing a main fermentation solution;
   extracting a sterilized main fermentation solution from which the predetermined strain of yeast is removed from the main fermentation solution in a main fermentation separating means; and
   circulating the main fermentation solution between said main fermentation section and said main fermentation solution-separating means.

23. The method according to claim 6, which further comprises:
   adding to a raw solution stored in an afterripening fermentation section a predetermined strain of afterripening yeast thereby preparing an afterripening fermentation solution;
   extracting an asceptic afterripening fermentation solution from which the predetermined strain of afterripening yeast has been removed from the afterripening fermentation solution in an afterripening fermentation separation means; and
   circulating the afterripening fermentation solution between said afterripening fermentation section and said afterripening fermentation solution-separation means.

24. A method of producing miso, comprising the steps of:
   preparing a raw solution as a flavor raw material of the miso;
   sterilizing the prepared raw solution by heating;
   converting the raw solution into a flavor solution by means of a predetermined fermentation treatment;
   preparing a digestive material which is a major raw material of the miso; and
   mixing the flavor solution with the digested material to produce the miso.

25. A method of producing miso, comprising the steps of:
   preparing a raw solution as a flavor raw material of the miso;
   converting the raw solution into a flavor solution by means of a predetermined fermentation treatment;
   preparing a digested material which is a major raw material of the miso;
   mixing the flavor solution with the digested material to prepared the miso; and
   sterilizing the miso by heating.

26. A method of producing miso, comprising the steps of:
   preparing a raw solution as a flavor raw material of the miso;
   converting the raw solution into a flavor solution by:
      (i) performing a lactic fermentation treatment on the raw solution to prepare a lactic fermentation solution;
      (ii) performing a first fermentation treatment on half of the lactic fermentation solution prepared in step (i) to prepare a main fermentation solution;
      (iii) sterilizing the main fermentation solution obtained by heating;
      (iv) performing a second fermentation treatment on the remaining half of the lactic fermentation solution prepared in step (i) to prepare an afterripening fermentation solution; and
      (v) combining the main fermentation solution and the afterripening fermentation to form the flavor solution;
   preparing a digested material which is a major raw material of the miso; and
   mixing the flavor solution with the digested material to produce the miso.

27. A method of producing miso, comprising the steps of:
   preparing a raw solution as a flavor raw material of the miso;
   converting the raw solution into a flavor solution by
      (i) performing a lactic fermentation treatment for the raw solution to prepare a lactic fermentation solution;

(ii) performing a first fermentation treatment on half of the lactic fermentation solution prepared in step (i) to prepare a main fermentation solution;

(iii) performing a second fermentation treatment on the remaining half of the lactic fermentation solution prepared in step (i) to prepare an afterripening fermentation solution;

(iv) sterilizing the afterripening fermentation solution by heating;

(v) combining the main fermentation solution and the afterripening solution to form the flavor solution;

preparing a digested material which is a major raw material of the miso; and mixing the flavor solution with the digested material to produce the miso.

28. A method of producing miso, comprising the steps of:

preparing a raw solution containing glucose, tamari-shoyu and salt;

fermenting the raw solution initially in the presence of lactic acid bacteria thereby producing a lactic fermentation solution;

fermenting a portion of the lactic fermentation solution in a main fermentation zone with yeast which converts glucose remaining in the lactic fermentation solution to ethanol and fermenting the remaining portion of the lactic fermentation solution in an afterripening zone with yeast which results in production of flavor components in the lactic fermentation solution;

combining the solution from the main fermentation zone and the afterripening zone thereby forming a flavored solution;

preparing a digested material of steam boiled soybeans, koji of rice and salt, which material constitutes the major raw material of the miso product; and mixing the flavored solution with the digested material thereby producing miso.

* * * * *